US009030050B1

(12) United States Patent  (10) Patent No.: US 9,030,050 B1
Linjama et al.  (45) Date of Patent: May 12, 2015

(54) VOLTAGE AMPLIFIER

(75) Inventors: Jukka Linjama, Espoo (FI); Timo Latvala, Espoo (FI)

(73) Assignee: Senseg Ltd. (FI)

( * ) Notice: Subject to any disclaimer, the term of this patent is extended or adjusted under 35 U.S.C. 154(b) by 709 days.

(21) Appl. No.: 13/303,592

(22) Filed: Nov. 23, 2011

Related U.S. Application Data

(60) Provisional application No. 61/417,388, filed on Nov. 26, 2010.

(51) Int. Cl.
*H02J 1/00* (2006.01)
*H02J 3/00* (2006.01)
*H02J 1/10* (2006.01)
*H02J 3/36* (2006.01)
*H02J 3/38* (2006.01)
*H02J 1/08* (2006.01)

(52) U.S. Cl.
CPC ... *H02J 1/00* (2013.01); *H02J 1/10* (2013.01); *H02J 3/36* (2013.01); *H02J 3/382* (2013.01); *H02J 1/102* (2013.01); *H02J 1/08* (2013.01)

(58) Field of Classification Search
CPC .............. H02J 1/102; H02J 3/36; H02J 1/10; H02J 1/08; H02J 3/382
USPC ........ 307/82, 80, 66, 64, 9.1, 104; 340/407.1, 340/407.5; 345/173, 174, 171
See application file for complete search history.

(56) References Cited

U.S. PATENT DOCUMENTS

| | | | |
|---|---|---|---|
| 7,982,588 B2 * | 7/2011 | Makinen et al. | 340/407.2 |
| 8,299,905 B2 * | 10/2012 | King | 340/407.1 |
| 8,326,462 B1 * | 12/2012 | Provancher | 700/264 |
| 8,361,000 B2 * | 1/2013 | Gaspard | 601/84 |
| 2002/0145512 A1 * | 10/2002 | Sleichter et al. | 340/407.1 |
| 2009/0236917 A1 * | 9/2009 | Bettenwort et al. | 307/82 |
| 2010/0052627 A1 * | 3/2010 | Otsuka et al. | 323/225 |
| 2010/0171715 A1 * | 7/2010 | Peterson et al. | 345/173 |
| 2011/0285637 A1 * | 11/2011 | Karkkainen | 345/173 |

* cited by examiner

*Primary Examiner* — Rexford Barnie
*Assistant Examiner* — Jagdeep Dhillon
(74) *Attorney, Agent, or Firm* — Schwegman Lundberg & Woessner, P.A.

(57) ABSTRACT

In an embodiment, a voltage amplifier is provided. In this voltage amplifier, a DC/DC boost converter converts an input DC voltage to an output DC voltage, which is higher than the input DC voltage. A DC/AC converter connected to the DC/DC boost converter converts the output DC voltage to an AC pulse-train. A voltage multiplier connected to the DC/AC converter converts the AC pulse-train to an amplified output DC voltage that is higher than the AC pulse-train. A discharger connected to the voltage multiplier can discharge the amplified output DC voltage.

14 Claims, 9 Drawing Sheets

VOLTAGE AMPLIFIER

CROSS-REFERENCES TO RELATED APPLICATIONS

This application claims the benefit of U.S. Provisional Application No. 61/417,388, filed Nov. 26, 2010, and entitled "Voltage Amplifier," the disclosure of which is incorporated herein by reference.

FIELD

The present disclosure relates generally to signal amplification, and in an example embodiment, the disclosure relates to a voltage amplifier.

BACKGROUND

A voltage amplifier basically accepts an input voltage from a voltage source and provides an output voltage that is a magnified replica of the input voltage. Conventional voltage amplifiers with high voltage gains (e.g., 3 V input to 1000V output) use conventional transformers, which are large, bulky magnetic components that contribute to significant current loss. Accordingly, conventional voltage amplifiers with high gains cannot fit within small electronic devices, particularly handheld devices such as cellular phones and tablet computers. Furthermore, the large amount of current draw from conventional voltage amplifiers significantly shortens battery life, thereby making them ill-adapted for use in electronic devices powered by batteries.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to limit the scope of this application to any single invention or inventive concept if more than one is in fact disclosed.

Figure 1:
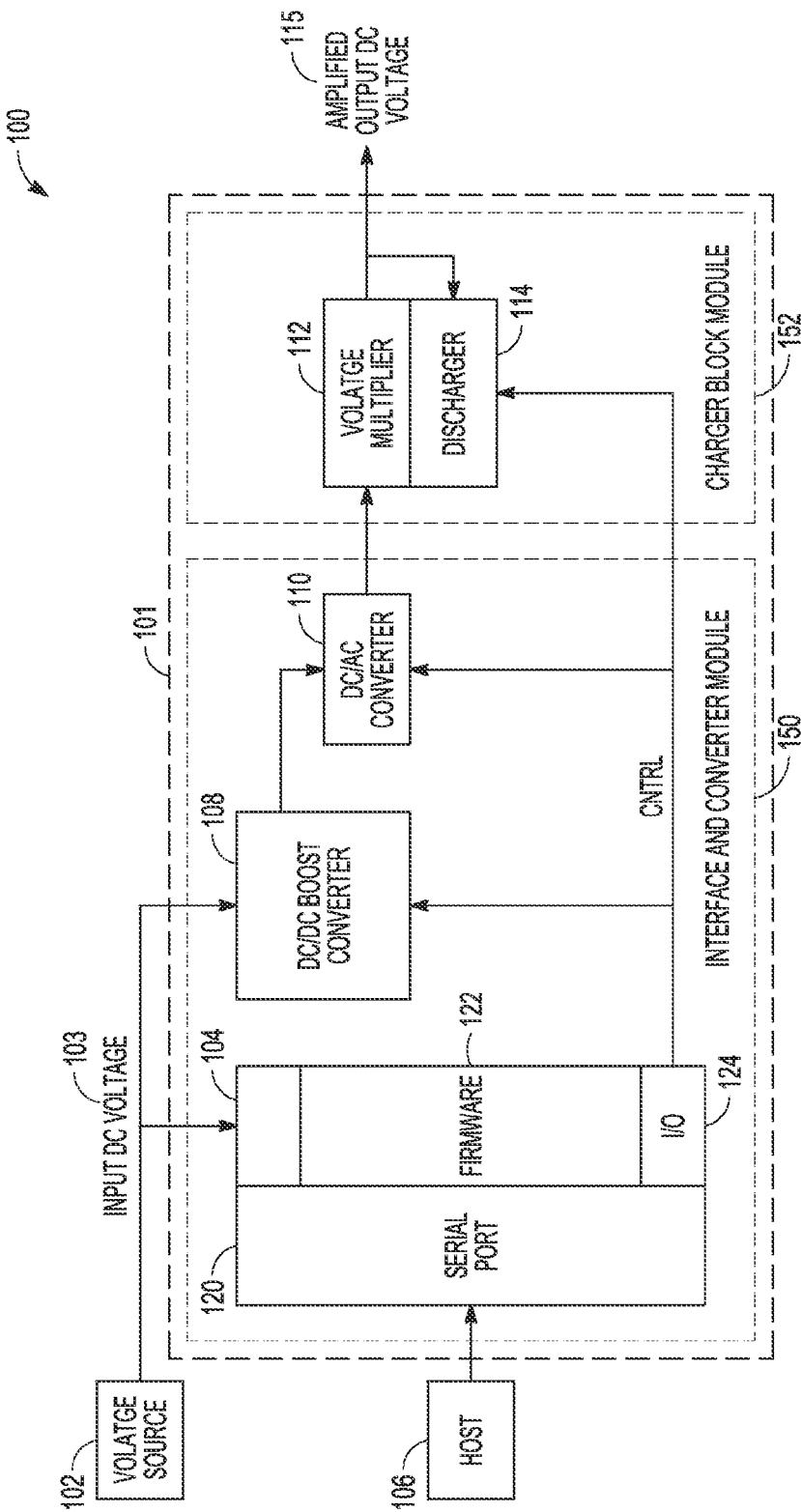
FIG. 1 is a block diagram depicting a system that includes an example embodiment of a voltage amplifier.

FIG. 1 is a block diagram depicting a system 100 that includes an example embodiment of a voltage amplifier 101. As depicted, the system 100 includes a voltage amplifier 101 connected to a voltage source 102 (e.g., a battery) and a host device 106. In general, the voltage amplifier 101 is configured to amplify the voltage supplied by the voltage source 102. For example, the voltage source 102 may supply an input DC voltage 103 between about 3 and 5 volts, and the voltage amplifier 101 having a high gain can amplify this input DC voltage 103 to an amplified output DC voltage 115 of up to several kilovolts.

The voltage amplifier 101 includes an interface and converter module 150 and a charger block module 152. In one embodiment, the interface and converter module 150 includes a controller 104, a DC/DC boost converter 108, and a DC/AC converter 110. Generally, the DC/DC boost converter 108 is configured to convert (or step-up) the input DC voltage 103 to an output DC voltage that is higher than the input DC voltage 103. The DC/AC converter 110, which is connected to the DC/DC boost converter 108, is configured to convert the output DC voltage from the DC/DC boost converter 108 to an AC pulse-train, which will be described in more detail below.

As depicted in FIG. 1, the charger block module 152 includes a voltage multiplier 112 and a discharger 114. In general, the voltage multiplier 112, which is connected to the DC/AC converter 110, is configured to convert the AC pulse-train from the DC/AC converter 110 to an amplified output DC voltage 115 that is higher than the AC pulse-train. The discharger 114, which is connected to the voltage multiplier 112, is configured to discharge the amplified DC voltage 115 from the voltage multiplier 112.

The controller 104 generally controls the DC/DC boost converter 108, the DC/AC converter 110, and the discharger 114 based on signals from the host device 106. In this embodiment, the controller 104 includes a serial port 124 for interfacing with the host device 106 and an input/output port 124 that connects to the DC/DC boost converter 108, the DC/AC converter 110, and the discharger 114. The controller 104 also includes firmware 122 that includes the logic to control the various components 108, 110, and 114 based on signals from the host 106. In particular, the controller 104 adjusts or controls the duty cycle of the DC/DC boost converter 108 and also controls the switching in the DC/AC converter 110 to cause the DC/AC converter 110 to generate the AC pulse-train. The discharge of the amplified output DC voltage 115 from the voltage multiplier 112 is also controlled by the controller 104, the details of which are explained below.

The amplified output DC voltage 115 may be connected to and used to power a variety of different electronic devices. In one example embodiment, the voltage amplifier 101 depicted in FIG. 1 may be used to amplify voltage supplied to a tactile stimulation apparatus. Particularly, as will be explained in detail below, the voltage amplifier 101 may be connected to composite sections of the tactile stimulation apparatus that generate or output tactile effects.

Figure 2:
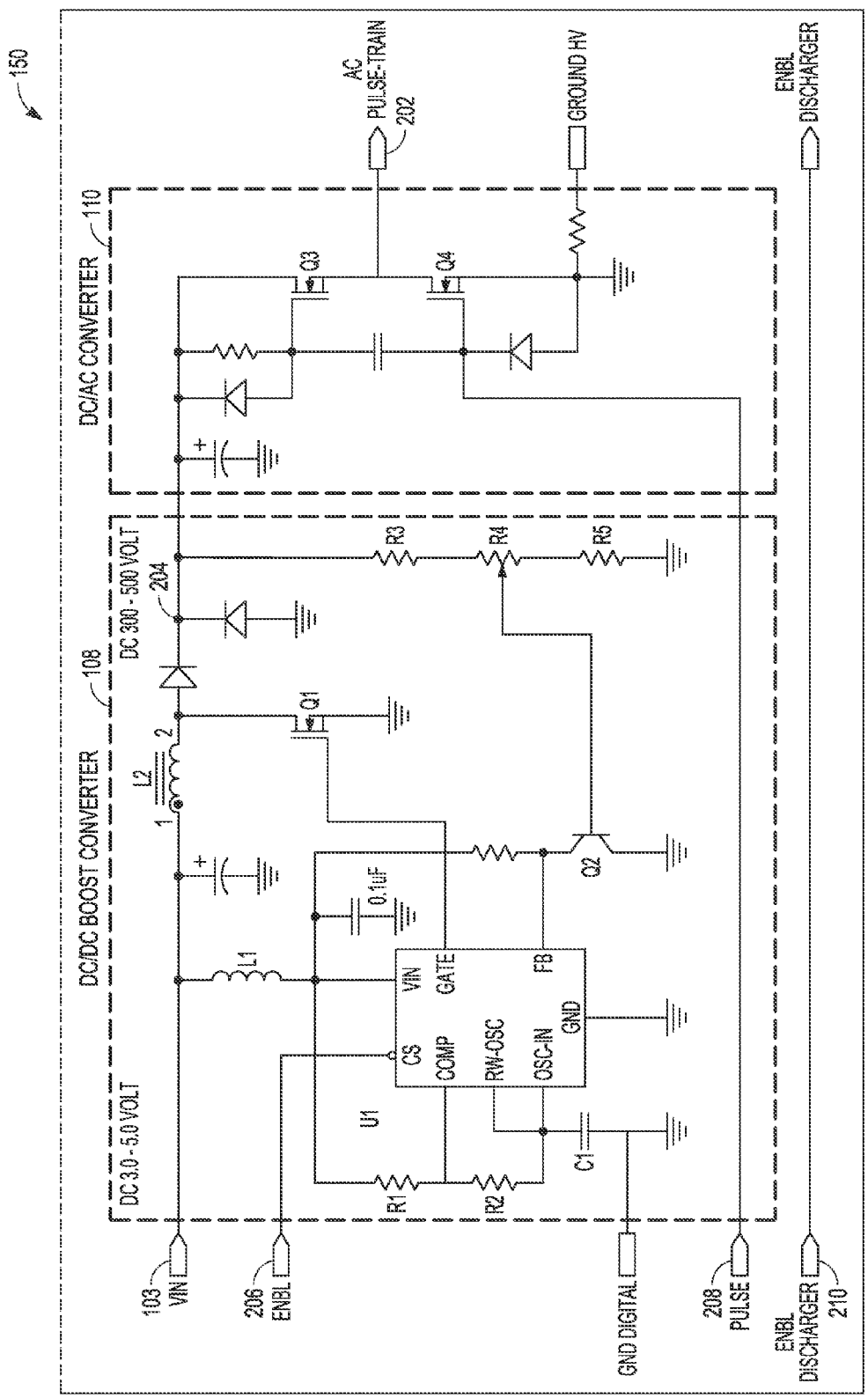
FIG. 2 is a circuit diagram depicting circuitries associated with an example embodiment of an interface and converter module.

FIG. 2 is a circuit diagram depicting circuitries associated with an example embodiment of an interface and converter module 150. In part, the interface and converter module 150 includes a DC/DC boost converter 108 and a DC/AC converter 110. The DC/DC boost converter 108 is a step-up DC/DC switching converter that uses transistor switch Q1, which is connected between the inductor L2 and a ground reference, to pulse-width modulate the input DC voltage 103 into inductor L2. Particularly, the transistor switch Q1 receives a control signal 206 from a controller (e.g., controller 104 depicted in FIG. 1) for adjusting a duty cycle of the DC/DC boost converter 108.

The output DC voltage generated by the DC/DC boost converter 108, at node 204, is related directly to a duty cycle of the pulses. That is, the duty cycle controls the output DC voltage. In one embodiment, a controller (e.g., controller 104 depicted in FIG. 1) may use the control signal 206 for turning the transistor switch Q1 on and off. A switch controller included in the DC/DC boost converter 108 receives a feedback signal transmitted by way of resistors R3, R4, and R5 and transistor switch Q2, and adjusts the duty cycle and/or the switching frequency accordingly. In one embodiment, the duty cycle can be between approximately 95% and 98%, which can be used when the load is highest and the input DC voltage 103 is lowest. In an alternate embodiment, the duty cycle can be between approximately 20% and 95%. Given that the final amplified output DC voltage output is proportional to the output DC voltage at node 204, the amplitude of the final amplified output DC voltage output can be adjusted by adjusting the DC voltage at node 204. This can be done, for example, by using an analog switch controlled by the controller to modify the feedback signal by way of resistors R3, R4, and R5.

An alternative embodiment for generating the gate drive for the transistor switch Q1 and for receiving voltage feedback from the resistor network R3, R4, and R5 would be to use a controller with internal timer for pulse wave generation and a built-in analog-to-digital converter for receiving feedback. For example, the controller 104 depicted in FIG. 1 can communicate with an external host device, which provides the overall timing. In another example, the same controller may also use another built-in timer to generate the needed clock signal for the DC/AC converter 110.

In one embodiment, the input DC voltage from a voltage source is between about 3 V and 5 V. The DC/DC boost converter 108 can step-up or convert this input DC voltage to an output DC voltage, at node 204, between about 300 V and 500 V. In another embodiment, the DC/DC boost converter 108 can step-up or convert this input DC voltage to a maximum output DC voltage of about 500V. As used herein, the term "about" or "approximately" means that the specified dimension or parameter may be varied within an acceptable tolerance for a given application. In some embodiments, the acceptable tolerance is ±10%.

Still referring to FIG. 2, the DC/AC converter 110 is configured to convert the output DC voltage, at node 204, to an AC pulse-train 202. Particularly, the output DC voltage is converted into the AC pulse-train 202 by using a pair of transistor switches Q3 and Q4, which are connected between the output DC voltage and ground reference. By switching Q4, current from the output DC voltage can be made to flow through to ground. Conversely, by switching Q3 instead, the current can be made to flow through output of the DC/AC converter 110. Therefore, by switching the two transistor switches Q3 and Q4 on alternately, an alternating current can be produced. A controller (e.g., controller 104 depicted in FIG. 1) controls the switching of the transistor switches Q3 and Q4 by transmitting, in part, control signal 208, which controls switching of the transistor switch Q4.

It should be noted that it can take several cycles of the AC pulse-train 202 for the amplified output DC voltage to reach its maximum value. For example, the rise time of a 10-stage half-wave multiplier is about 100 cycles to 67% and about 220 cycles to 90% of the nominal amplitude. Accordingly, output voltage control can be implemented using short, repeated burst of the AC pulse-train 202. For example, the output DC voltage at node 204 reaches its maximum value after about 200 pulses. If an amplitude of 10 of the maximum value is to be obtained, then the number of pulses is then about 20. If the clock frequency is 200 kHz, then one pulse is 5 μs in duration. Hence, the durations of the above-mentioned pulse trains are 1 ms and 100 μs, respectively.

Additionally, the controller is also configured to transmit a control signal 210 to a discharger included in a charger block module (not shown in FIG. 2). In one embodiment, the discharger is comprised of a resistor connected to ground. This control signal 210 generally signals the discharger to discharge the amplified output DC voltage outputted from the voltage multiplier (also not shown in FIG. 2). In another embodiment, the discharger is a switch capable of connecting the voltage output to a ground reference potential.

It should be noted that the need for discharging can arise from, for example, the application of the voltage amplifier in generating electrosensory sensations, as described in more detail below. For example, the generation of electrosensory sensations may require a high voltage waveform with frequencies from 10 Hz to 1000 Hz. Such an active discharger it enables fast discharging and faster waveform frequencies. The use of either passive or active discharger circuit differentiates the circuit from traditional voltage multipliers, which like in television sets, have been characteristically used to generate stable DC voltages.

Figure 3:
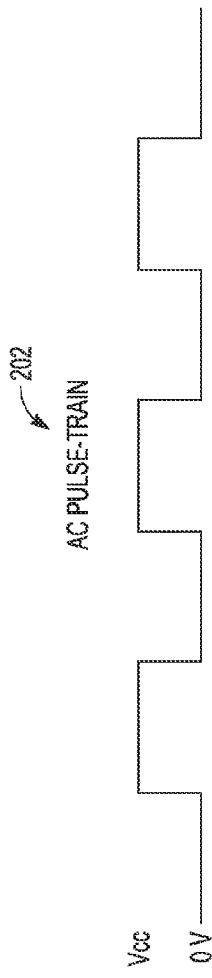
FIG. 3 is a timing diagram of the AC pulse-train signal generated by the example embodiment of the DC/AC converter depicted in FIG. 2.

FIG. 3 is a timing diagram of the AC pulse-train signal 202 generated by the example embodiment of the DC/AC converter 110 depicted in FIG. 2. As discussed previously in FIG. 2, the DC/AC converter 110 converts the output DC voltage from the DC/DC boost converter 108 into an AC pulse-train 202 by using a pair of transistor switches Q3 and Q4. The transistor switches Q3 and Q4 are turned on alternately for a period of time. The output AC pulse-train 202 is generated from switching the transistor switches Q3 and Q4 alternately. The output waveform of the AC pulse-train 202, as depicted in the timing diagram of FIG. 3, comprises alternating rectangular pulses between Vcc (output DC voltage from DC/DC boost converter 108) and zero Volts.

Figure 4:
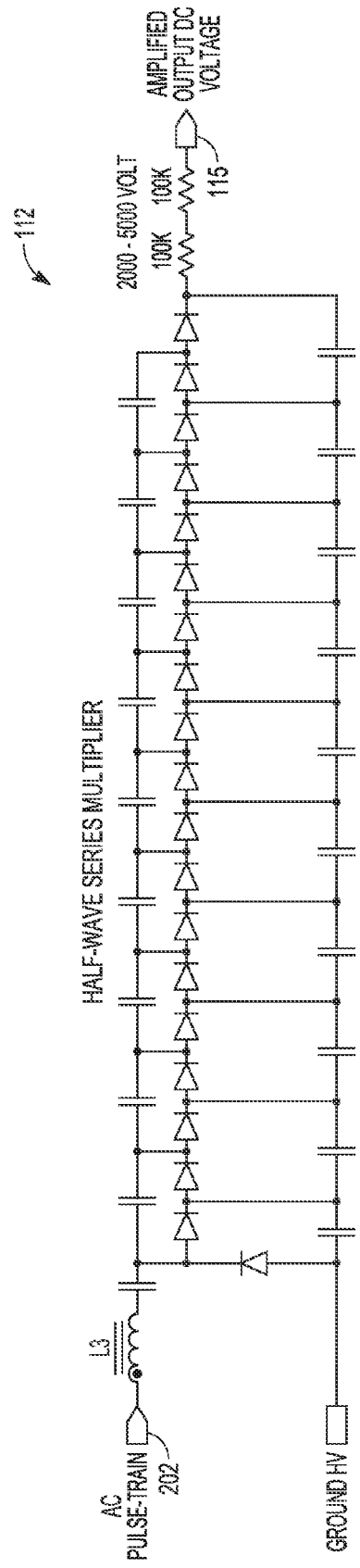
FIG. 4 is a circuit diagram of one embodiment of the voltage multiplier.

FIG. 4 is a circuit diagram of one embodiment of the voltage multiplier 112. As discussed above, the voltage multiplier 112 is configured to convert the AC pulse-train 202 outputted from the DC/AC converter to an amplified output DC voltage 115 that is higher than the AC pulse-train 202. In this embodiment, the voltage multiplier 112 comprises a half-wave series multiplier. Unlike conventional half-wave series multipliers, the an example embodiment of the half-wave series multiplier additionally includes an inductor L3, which is connected between the DC/AC converter and portions of the half-wave series multiplier.

Given that the input AC pulse-train 202 is not a pure sine wave, as depicted in FIG. 3, the inductor L3 gives more power to the half-wave series multiplier circuit. In one embodiment, the inductor L3 is configured to approximately double a voltage of the input AC pulse-train 202. The inductor L3 can increase the voltage because for each cycle, the energy is stored in the inductor L3 while the charge is moving to the half-wave series multiplier after switching pulse edge (rising or falling voltage) of the AC signal. After the edge, there is a voltage peak that ideally doubles the voltage of the driving AC pulse-train 202. Instead of a transient oscillation in the LC circuit formed by the inductor L3 and the multiplier capacitors, the diodes of the half-wave series multiplier pick up the largest peak of the oscillation and pass the voltage forward. With this transient, current flows in one direction only, and stops when the peak voltage is reached in the first multiplier stage. This may provide improved efficiency in transferring energy from the DC/AC converter to the half-wave series multiplier. It should be noted that without the inductor L3, the efficiency of the driving energy (the effective voltage of the AC pulse-train 202) driven to the half-wave series multiplier may be less. Therefore, an input AC pulse-train 202 between, for example, about 300 and 500 AC volts can be converted to an amplified output DC voltage 115 between about 2 and 5 kV with relatively a small number of multiplier stages. It should be appreciated that the inductor L3 can be dimensioned such that the oscillating resonant frequency of the LC circuit is optimal with given constraints. Particularly, the inductor L3 can be dimensioned to be fast enough to follow the driving AC switching frequency (e.g., more than 20 kHz), but slow enough to not create radio frequency interference (e.g., less than 1 MHz). In addition, non-idealities of the components (e.g., parasitic inductance of capacitors and capacitance of diodes and transistors) may need to be considered for the selection of the optimal inductance value. In one example embodiment, the inductor L3 can be between about 0.1 mH and about 10 mH.

Figure 5:
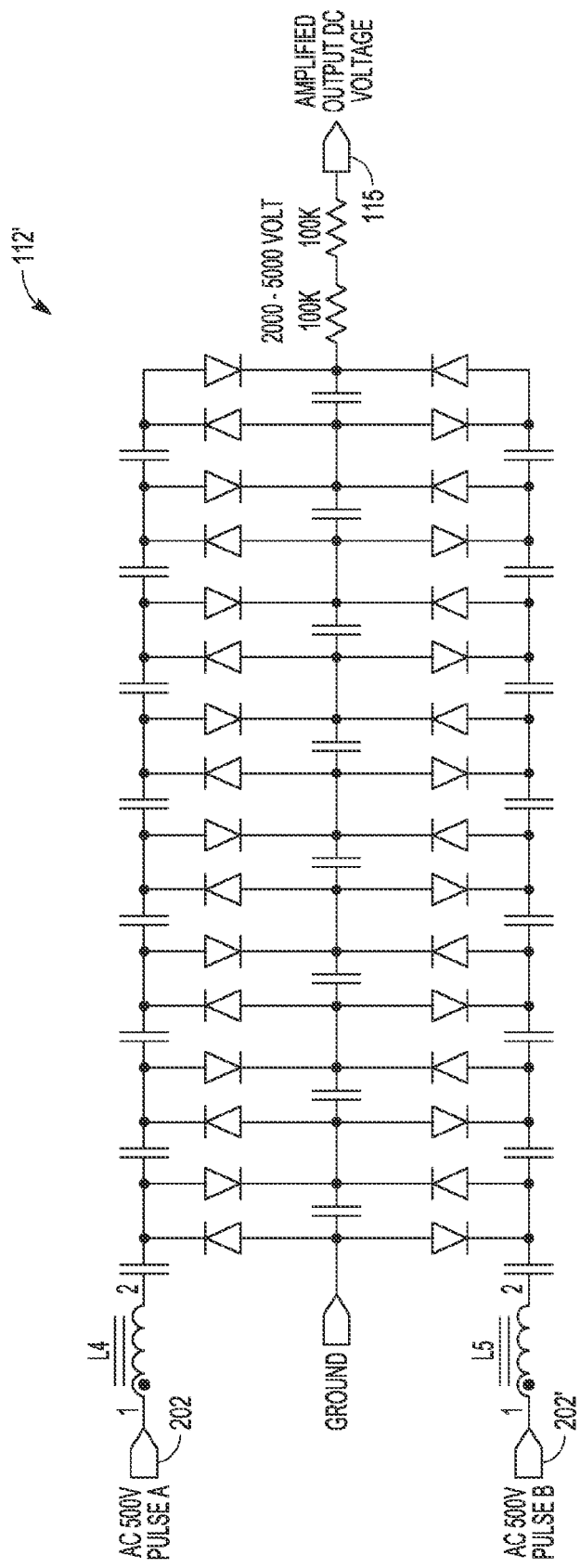
FIG. 5 is a circuit diagram of an alternate embodiment of the voltage multiplier.

FIG. 5 is a circuit diagram of an alternate embodiment of the voltage multiplier 112'. Here, the voltage multiplier 112' includes a full-wave series multiplier. Unlike conventional full-wave series multipliers, the voltage multiplier 112' additionally includes inductors L4 and L5, which are connected between a DC/AC converter (not shown) and the full-wave series multiplier 501, in accordance with one example embodiment. The input AC rectangular pulse-train 202 is an inverse of the input AC rectangular pulse-train 202'.

Similarly, the inductors L4 and L5 are configured to approximately double a voltage of the input AC pulse-train 202. As an example, an input AC pulse-train 202 between about 300 and 500 AC volts can be converted to an amplified output DC voltage 115 between about 2 kV and 5 kV.

Figure 6:
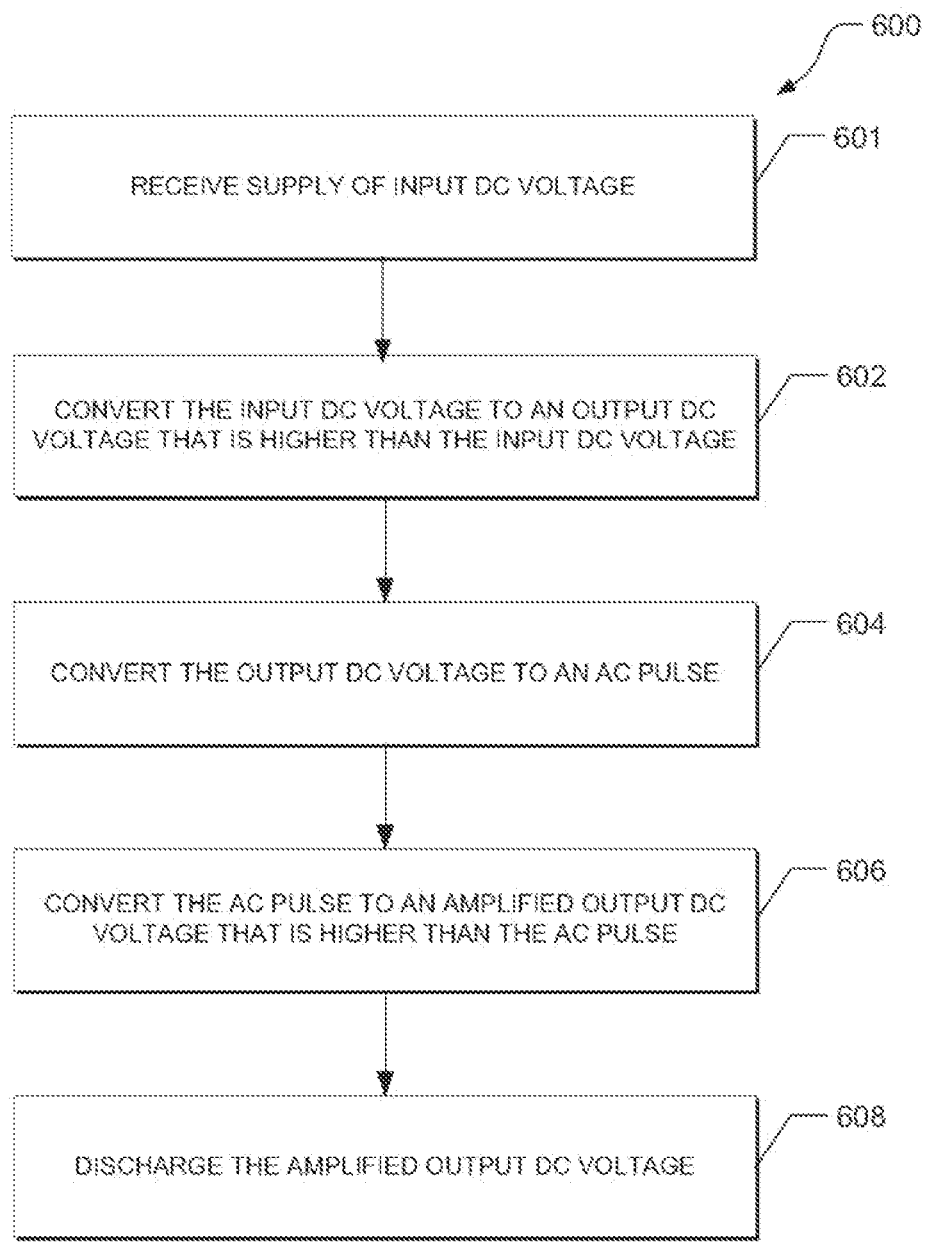
FIG. 6 depicts a flow diagram of a general overview of a method, in accordance with an embodiment, for amplifying voltage.

FIG. 6 depicts a flow diagram of a general overview of a method 600, in accordance with an embodiment, for amplifying voltage. In an example embodiment, the method 600 may be implemented by the voltage amplifier 101 depicted in FIG. 1. Referring to FIG. 6, a DC/DC boost converter receives at 601 a supply of input DC voltage from a voltage source. At 602, the DC/DC boost converter converts the input DC voltage to an output DC voltage that is higher than the input DC voltage. A DC/AC converter then converts, at 604, the output DC voltage from the DC/DC boost converter to an AC pulse-train. Thereafter, a voltage multiplier then converts, at 606, the AC pulse-train to an amplified output DC voltage that is higher than the AC pulse-train. At 608, a discharger can discharge this amplified output DC voltage based on control signals from a controller. As discussed above, the controller controls the DC/DC boost converter, the DC/AC converter, and the discharger.

A voltage amplifier using the above-mentioned methodologies can, for example, amplify about 5 volts to several kilovolts. As illustrated in FIGS. 1, 2, 4, and 5, the various embodiments of the voltage amplifier capable of having such a high gain can amplify the voltage without use of typical transformers, which are bulky and contribute to significant current loss. Accordingly, the embodiments of the voltage amplifier described above can have small form factors and thus, can fit within small electronic devices, one example of which will be described in detail below. Furthermore, embodiments of the voltage amplifier described above may draw less current when compared to conventional voltage amplifiers.

Figure 7:
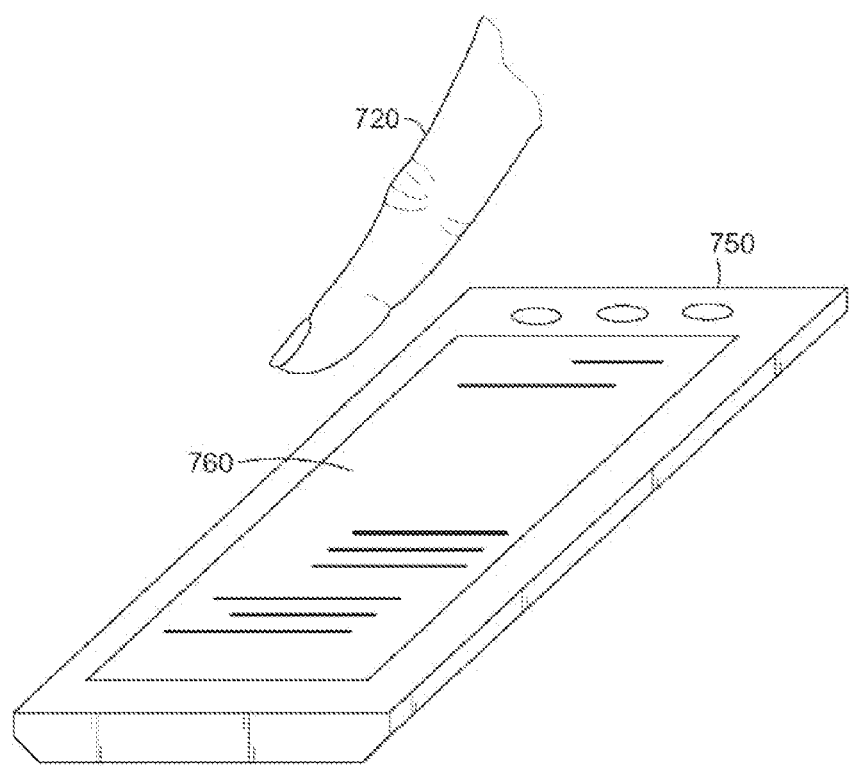
FIG. 7 is a diagram depicting an example of a tactile stimulation apparatus, in accordance with an example embodiment, that uses the voltage amplifier discussed above.

FIG. 7 is a diagram depicting an example of a tactile stimulation apparatus 750, in accordance with an example embodiment, that uses the voltage amplifier discussed above. It should be understood that "tactile" is defined as relating to a sensation of touch or pressure, and the tactile stimulation apparatus 750 is capable of creating a sensation of touch or pressure to a body member 720 (e.g., a finger) based on the creation of a pulsating Coulomb force, as will be explained in more detail.

The tactile stimulation apparatus 750 may be in the form of a tactile display device that is capable of displaying graphics as well as creating a sensation of touch to the body member 720. FIG. 7 depicts an example of such a tactile display device in the form of a smart phone having a touch screen panel 760 (or touch-sensitive screen) that is responsive to touches by the body member 720.

In addition to displaying graphics, the touch screen panel 760 can also create a sensation of touch or pressure to the body member 720. The creation of the touch sensation to the body member 720 may involve the generation of high voltages using the voltage amplifier discussed above. In addition to the smart phone depicted in FIG. 1, the tactile stimulation apparatus 150 may include a variety of other apparatuses, such as computer monitors, televisions, door handles, touch pads, tablet computers, mice, keyboards, switches, and joysticks.

Figure 8:
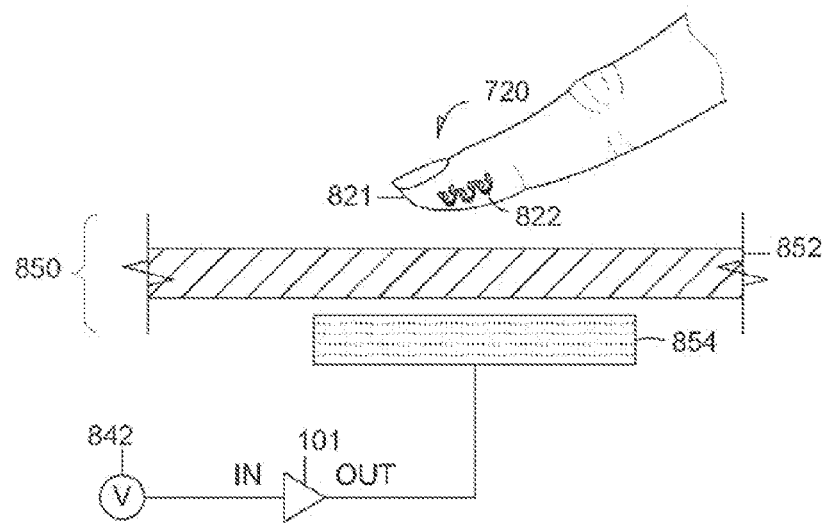
FIG. 8 is a diagram of composite section structures and components used to generate electrosensory sensations in a tactile stimulation apparatus, according to an example embodiment.

FIG. 8 is a diagram of composite section structures and components used to generate electrosensory sensations in a tactile stimulation apparatus, according to an example embodiment. An example of a tactile stimulation apparatus includes a composite section 850 and a voltage source 842 connected to the composite section 850 by way of a voltage amplifier 101. A "composite section," as used herein, refers to a distinct part or a number of parts that comprise a tactile stimulation apparatus. The composite section 850, in one embodiment, is an outer area of a tactile stimulation apparatus that is configured to be touched by the body member 720. Here, this example of the composite section 250 has a thickness and, in an embodiment, the composite section 850 comprises an insulation region 852, which is touchable by the body member 720, and an electrode region 854.

The insulation region 852 is an area, section, or portion of the composite section 850 that comprises one or more insulation materials. An insulator is a material that does not conduct electricity or is a material having such low conductivity that the flow of electricity through the material is negligible. Examples of insulation materials include glass, polyethylene, wood, rubber-like polymers, Polyvinyl chloride, silicone, Teflon, ceramics, and other insulation materials.

The electrode region 854 may be conductive or semiconductive. In the embodiment where the electrode region 854 is conductive, the electrode region 854 is an area, section, or portion of the composite section 850 that comprises one or more conducting materials having high conductivity.

Examples of conducting materials include brass, graphite, copper, copper tungsten, copper zirconium diboride, gold, molybdenum, palladium, platinum, silver, tungsten, and other conducting materials. In one embodiment, the electrode region 854 may be included within an enclosure of the tactile stimulation apparatus. In an alternate embodiment, the electrode 854 can embedded behind the back cover of the tactile stimulation apparatus (e.g., a back cover of a smart phone or tablet computer). It should be noted that due to the relatively good electrical conductivity of the human body, a strong electric field is formed between the body member 720 touching composite section of the tactile stimulation apparatus. By embedding the electrode 854 behind the back cover, this electric field is coupled to a different body member (e.g., a second finger) holding the device, thereby creating a galvanic grounding that sets the human potential closer to a well-defined (non-floating) potential, and also creates a strong potential difference and electric field between the composite section 850 and the body member 720.

In the embodiment where the electrode region 854 is semiconductive, the electrode region 854 is an area, section, or portion of the composite section 850 that comprises one or more semiconducting materials. A semiconductor is a material that has an electrical conductivity between that of a conductor and an insulator. Accordingly, a semiconducting region 854 is a region that is neither a perfect conductor nor a perfect isolator. The electrical conductivity of the semiconducting region 854 may be generally in the range $10^3$ Siemens/cm to $10^{-8}$ S/cm. However, rather than defining the limits of resistance of the semiconducting region 854, it can be useful to present dimensioning guidelines. In one embodiment, the surface resistance of the semiconducting region 854 may be such that the semiconducting region 854 can be charged in a reasonable time to a sufficient voltage for creating an electrosensory sensation (a sensation of apparent vibration) to the body member 720. In some applications, such a reasonable charging time is less than 500 milliseconds, where, in one example, the charging time varies between 0.1 and 500 milliseconds. It should be appreciated that charging times less than 200 milliseconds may provide a quick feedback to the user. The surface resistance of the semiconducting region 854 is also a function its surface area. The larger the surface, the smaller is the required surface resistance, if the charging time is to be kept reasonable. Examples of semiconducting materials include semiconductive transparent polymers, zinc oxides, carbon nanotubes, indium tin oxide (ITO), silicon, germanium, gallium arsenide, silicon carbide, and other semiconducting materials.

Referring to FIG. 8, the output "OUT" of the voltage amplifier 101 is coupled to the electrode region 854, which effectively functions as an electrode. The insulation region 852 insulates the electrode region 854 against galvanic contact by the body member 720. In general, the voltage source 842 is a device that produces an electromotive force and, in this embodiment, is configured to charge the electrode region 854 to an electric potential, which is a point in an electric field expressed in volts, thereby producing an electrosensory sensation on the body member 720. Particularly, the insulation region 852 prevents a flow of direct current from the electrode region 854 to the body member 720. As a result, a capacitive coupling over the insulation region 852 is formed between the electrode region 854 and the body member 720, and this capacitive coupling produces an electrosensory sensation on the body member 720. Upon application of the charge, the capacitive coupling of the electrode (or electrode region 854) and the body member 720 generates a pulsating Coulomb force. The pulsating Coulomb force may stimulate vibration-sensitive receptors, mainly those called Pacinian corpuscles 822, which reside under the outermost layer of skin in the epidermis 821 of the body member 720.

The voltage amplifier 101 is driven by a signal "IN," as generated by the voltage source 842, and this signal results in a substantial portion of the energy content of the resulting Coulomb force to reside in a frequency range to which the Pacinian corpuscles 822 may be sensitive. For humans, this frequency range can be between 10 Hz and 1000 Hz. For example, the frequency can be between 50 Hz and 500 Hz or between 100 Hz and 300 Hz, such as about 240 Hz.

The voltage amplifier 101 and the capacitive coupling over the insulation region 852 are dimensioned such that the Pacinian corpuscles 822 or other mechanoreceptors are stimulated and an electrosensory sensation is produced. For this, the voltage amplifier 101 (or voltage source 842) may generate an output of several hundred volts or even several kilovolts. The alternating current driven into the body member 720 by way of capacitive coupling has a very small magnitude and can be further reduced by using, for example, a low-frequency alternating current.

It should also be appreciated that the voltage source 842 does not need to be physically coupled to the electrode region 854 to be able to charge the electrode region 854 to an electric potential. In an alternate embodiment, the voltage source 842 may be proximate to the electrode region 854, but not physically connected. In particular, the electric field generated by the voltage source 842 may charge the electrode region 854 to an electric potential without the voltage source 842 (or the voltage amplifier 101) physically connected to the electrode region 854. This capacitive transfer of energy may also be a type of capacitive coupling and referred to as a capacitive connection. Furthermore, the electrode region 854 depicted in FIG. 8 is proximate to the insulation region 852, but it should be appreciated that the composite section 850 may also have a variety of other different structures.

Figure 9A:
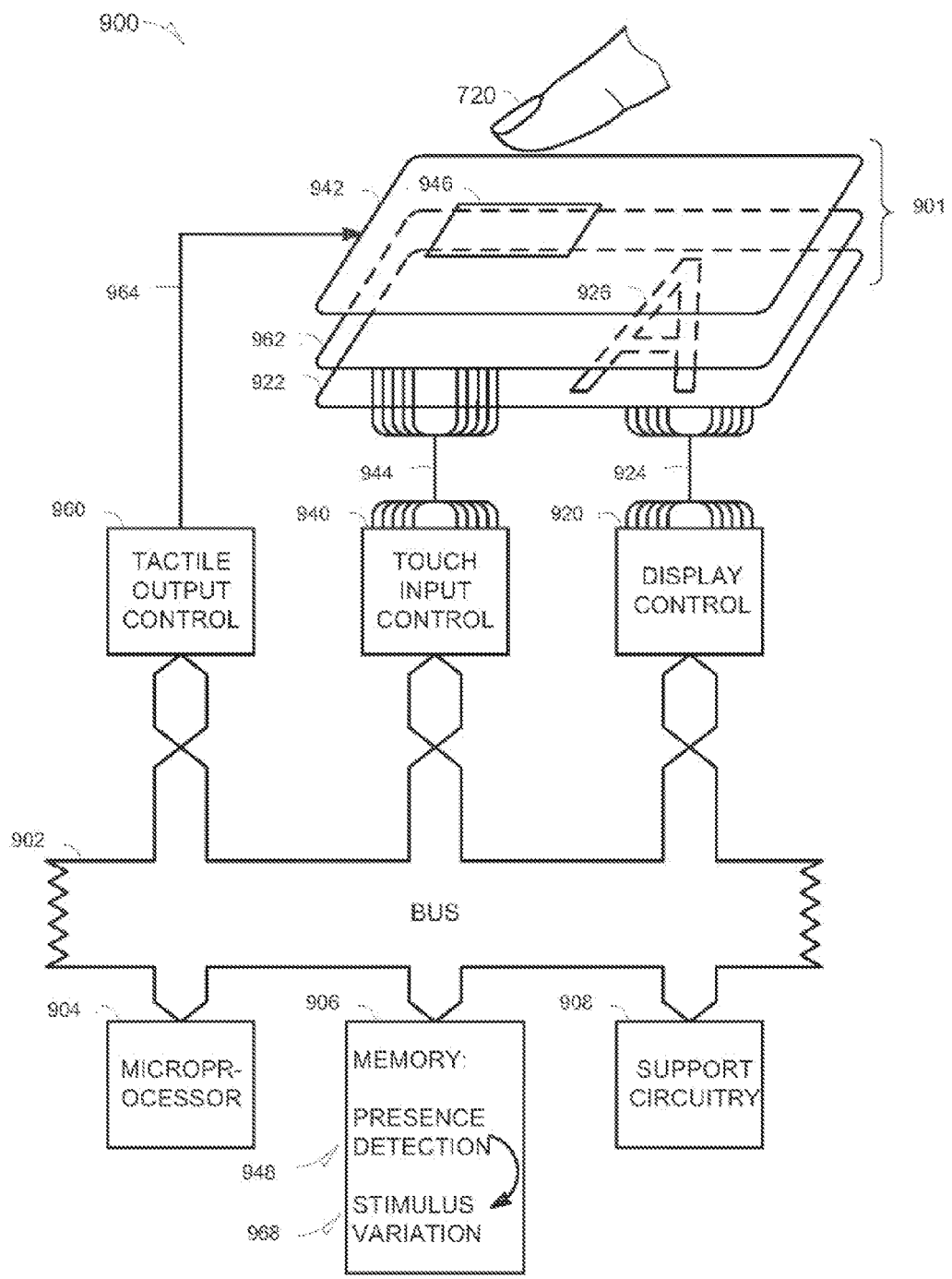
FIGS. 9A and 9B are schematic diagrams depicting various elements of different tactile stimulation apparatuses, in accordance with example embodiments of the present invention.
Figure 9B:
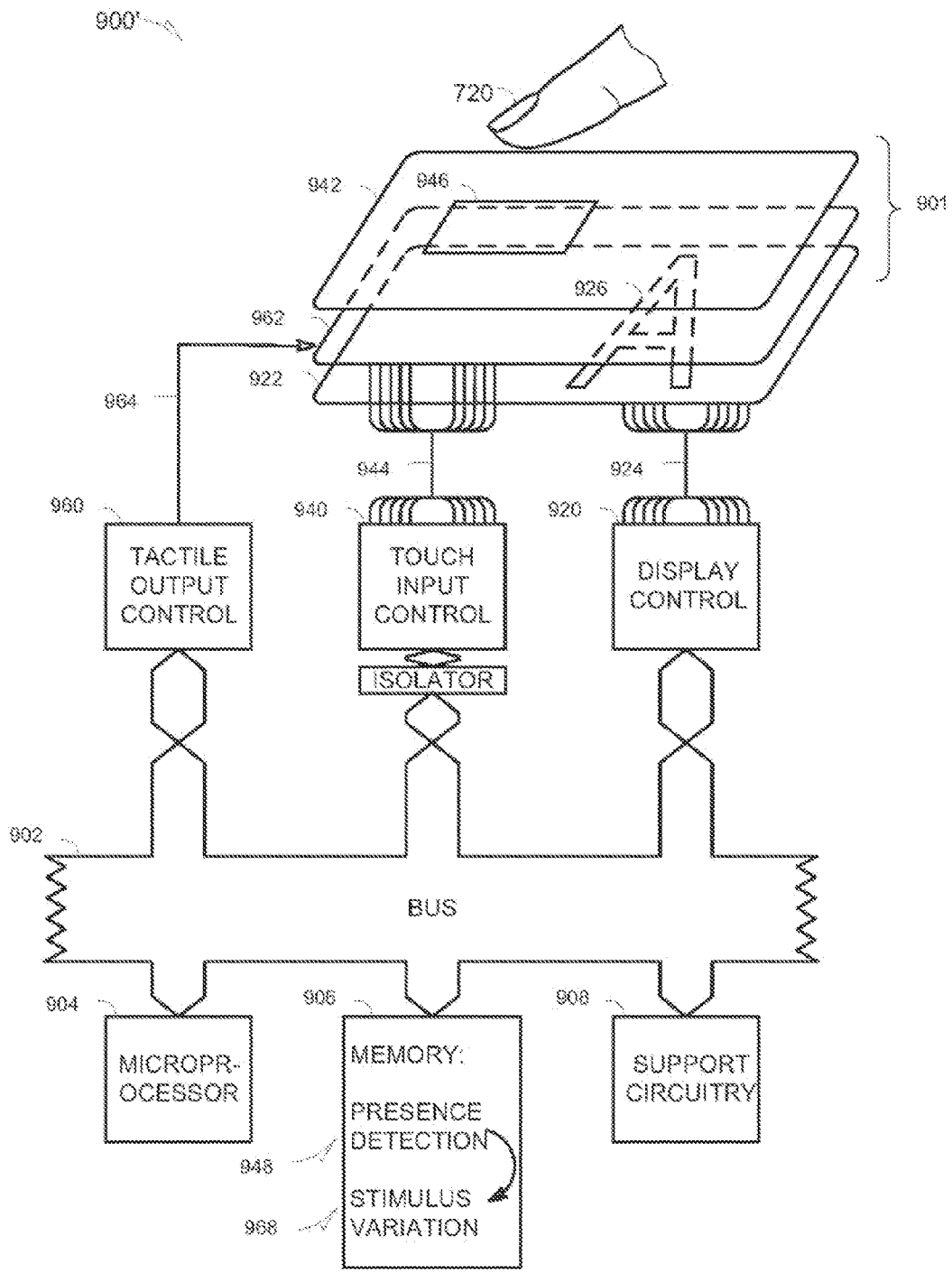

FIGS. 9A and 9B are schematic diagrams depicting various elements of different tactile stimulation apparatuses, in accordance with example embodiments of the present invention. In the embodiment depicted in FIG. 9A, the tactile stimulation apparatus 900 comprises a bus 902 providing inter-component connections between microprocessor 904, memory 906, processor support circuitry 908, display controller 920, tactile output controller 960, and touch input controller 940. The display controller 920 controls the display region 922 of a touch screen panel 901, such as a liquid-crystal display, by way of an array of connecting wires 924. Similarly, the touch input controller 940 controls a touch-sensitive region 962 by way of an array of connecting wires 944.

The tactile stimulation apparatus 900 also comprises a tactile output section, which comprises a tactile output controller 960 and tactile output region 942, which includes at least one semiconducting region as discussed above, interconnected by an interconnection wire 964. In the example embodiment depicted in FIG. 9A, the touch screen panel 901 is an integration of the tactile output region 942 with a touch-sensitive display, including the display region 922 and the touch-sensitive region 962.

As depicted in FIG. 9A, the display region 922 shows information 926, which is seen by the user through the touch-sensitive region 962 and the tactile output region 942. The touch-sensitive region 962 is scanned by the touch input controller 940, such that the microprocessor 904, under control of software stored in and executed from the memory 906, is aware of the presence or absence of the body member 720 on top of a predefined area 946. The composite section of the touch-sensitive region 962 may be completely homogenous, and the predefined areas, such as area 946, are created dynamically by the microprocessor 904, under control of the software, such that the X and Y coordinates of the body member 720, as it touches the touch-sensitive region 962, are compared with predefined borders of the predefined area 946.

Reference numeral 948 denotes a presence-detection logic stored within the memory 906. Execution of the presence-detection logic 948 by the microprocessor 904 causes the detection of the presence or absence of the body member 720 at the predefined area 946. A visual cue, such as a name of the function or activity associated with the predefined area 946, is typically displayed by the display region 922, as part of the displayed information 926, so as to help the user find the predefined area 946.

Additionally stored within the memory 906 is a stimulus-variation logic 968. Input information to the stimulus-variation logic 968 includes information on the presence or absence of the body member 720 at the predefined area 946. Based on this presence information, the stimulus-variation logic 968 has the effect that the microprocessor 904 instructs the tactile output controller 960 to vary the electrical input to the tactile output region 942, thus varying the electrosensory sensations caused to the body member 720. In one embodiment, the tactile output control includes the voltage amplifier discussed above. Thus, a user may detect the presence or absence of the displayed information at the predefined area 946 merely by way of tactile information (or electrosensory sensation), that is, without requiring visual clues.

An alternate embodiment of the tactile stimulation apparatus 900' for generating the electric field is presented in FIG. 9B. Instead of coupling the high voltage directly to the tactile output region 942, the high voltage, which is applied by way of interconnection wire 964, is connected to the touch-sensitive region 962. In this embodiment, the touch-sensitive region 962 can include conductive transparent printed traces. There is a natural capacitance between the tactile output region 942 and the touch-sensitive region 962. Accordingly, if the potential of the whole tactile stimulation apparatus 900' is modulated, the same potential change is capacitively coupled to the tactile output region 942.

Figure 10:
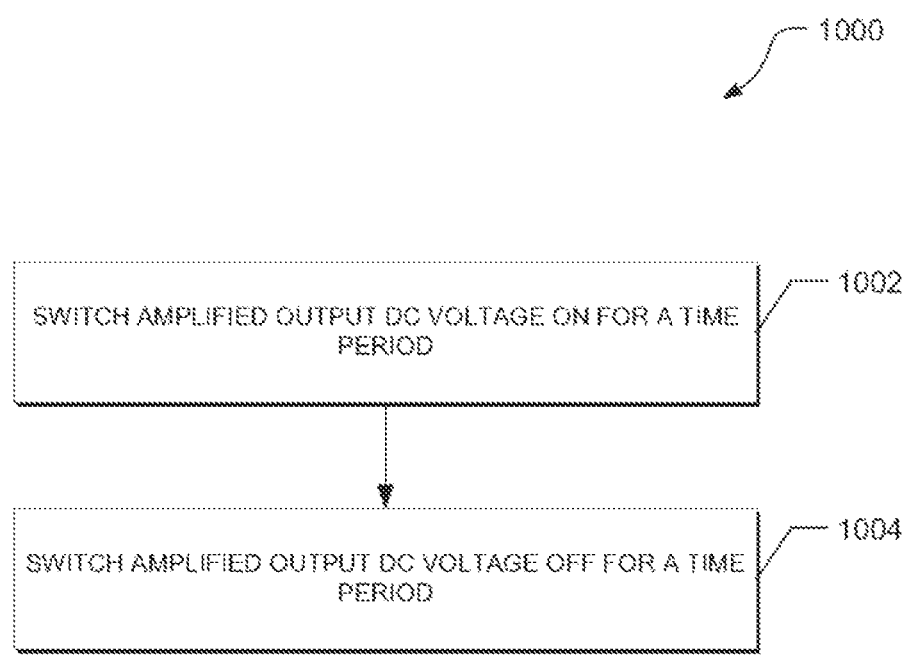
FIG. 10 depicts a flow diagram of a general overview of a method, in accordance with an embodiment, for reducing electromagnetic interference (EMI).

FIG. 10 depicts a flow diagram of a general overview of a method 1000, in accordance with an embodiment, for reducing electromagnetic interference (EMI). In general, EMI can be caused by rapidly changing current, which is present in a voltage amplifier. Particularly, a voltage amplifier includes power transistors that handle switching operations. Such power transistors are harmonic components that increase EMI in circuits, and a sufficiently high EMI can cause the circuits to malfunction. In accordance with an example embodiment, an amplified voltage from a voltage amplifier (e.g., the amplified output DC voltage discussed above) can be switched on and off to reduce EMI with circuitry of an electronic device. Particularly, as depicted at 1002, the amplified output DC voltage from a voltage amplifier can be switched on for a time period and then subsequently switched off for a time period at 1004. The method operations 1002 and 1004 may be repeated as long as needed to reduce interference.

In one embodiment, a tactile stimulation apparatus having a voltage amplifier can switch the amplified output DC voltage from the voltage amplifier on and off. In reference to FIG. 1, the voltage multiplier 112, for example, can include a switch, and this switch can be controlled to switch the output amplified DC voltage 115 on and off. In another example, a switch can be included in the DC/DC boost converter 108, and this switch can be controlled to switch the output DC voltage from the DC/DC boost converter 108 on and off (and consequently, the amplified output DC voltage 115 on and off). In yet another example, a switch can be included in the DC/AC converter 110, and this switch can be controlled to switch the AC pulse-train from the DC/AC converter 110 on and off (and consequently, the amplified output DC voltage 115 on and off). In reference to FIG. 9, the tactile output controller 960, microprocessor 904, or other controllers of the tactile stimulation apparatus 900 can control the switching of the amplified output DC voltage. As depicted in FIG. 1, in one example, the switching control signals can be transmitted by way of the serial port 124.

Returning to FIG. 10, the time period for switching the amplified output DC voltage on and off can be based on a variety of different variables. In one example embodiment, switching can be synchronized with touch input operation. In particular, the touch input solution read and tactile output operation can be multiplexed in time with the amplified output DC voltage such that, for example, the amplified output DC voltage can be switched off upon detection of a touch input.

In another example embodiment, switching can be synchronized with a frame frequency. That is, switching of the amplified output DC voltage on and off can be synchronized with every input frame rate frequency (e.g., from about 20 to about 200 Hz). In yet another embodiment, switching can be synchronized with a scan frequency. That is, switching of the amplified output DC voltage on and off can be synchronized with every input row or line scan frequency (e.g. from about 200 to about 10,000 Hz). Alternatively, touch input readings can be ignored while output is signaling (gating the input data stream to send new data).

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, the invention may lie in less than all features of a single disclosed embodiment. Thus, the following claims are hereby incorporated into the detailed description, with each claim standing on its own as a separate preferred embodiment.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A tactile stimulation apparatus comprising:
a voltage source configured to supply a direct current (DC) voltage;
a direct current (DC)/DC boost converter connected to the voltage source, the DC/DC boost converter configured to convert the DC voltage to an output DC voltage that is higher than the DC voltage;

a DC/alternate current (AC) converter connected to the DC/DC boost converter, the DC/AC converter configured to convert the output DC voltage to an AC pulse-train;

a voltage multiplier connected to the DC/AC converter, the voltage multiplier configured to convert the AC pulse-train to an amplified output DC voltage that is higher than the AC pulse-train;

a discharger connected to the voltage multiplier, the discharger configured to discharge the amplified output DC voltage; and a composite section proximate to the voltage multiplier, the composite section comprising an insulation region and an electrode region proximate to the insulation region, the insulation region configured to be touched by a body member, the amplified output DC voltage from the voltage multiplier to charge the electrode region to an electric potential producing an electrosensory sensation on the body member.

2. The tactile stimulation apparatus of claim 1, wherein the electrode region comprises a semiconducting material.

3. The tactile stimulation apparatus of claim 1, wherein the multiplier comprises:
a half-wave series multiplier; and
an inductor connected between the DC/AC converter and the half-wave series multiplier.

4. The tactile stimulation apparatus of claim 1, wherein the voltage multiplier comprises:
a full-wave series multiplier; and
a plurality of inductors connected between the DC/AC converter and the full-wave series multiplier.

5. The tactile stimulation apparatus of claim 1, further comprising a controller connected to the DC/DC boost converter, the DC/AC converter, and the discharger.

6. The tactile stimulation apparatus of claim 5, wherein the controller is configured to control the output DC voltage by driving the DC/AC converter in bursts, and wherein a duty cycle of the bursts controls the output voltage.

7. The tactile stimulation apparatus of claim 5, wherein the controller is configured to provide a clock signal to at least one of the DC/DC boost converter and DC/AC converter.

8. The tactile stimulation apparatus of claim 1, wherein the DC/DC boost converter comprises a controller that receives feedback from the output DC voltage.

9. The tactile stimulation apparatus of claim 1, wherein the insulation region prevents a flow of direct current from the electrode region to the body member and a capacitive coupling over the insulation region is firmed between the electrode region and the body member, wherein the capacitive coupling produces the electrosensory sensation on the body member.

10. The tactile stimulation apparatus of claim 1, further comprising:
a switch configured to switch the amplified DC output voltage on and off, wherein the switch is turned off to reduce electromagnetic interference.

11. The tactile stimulation apparatus of claim 10, wherein the switching is synchronized with a touch input operation.

12. The tactile stimulation apparatus of claim 10, wherein the switching is synchronized with a frame frequency.

13. The tactile stimulation apparatus of claim 10, wherein the switching is synchronized with a scan frequency.

14. The tactile stimulation apparatus of claim 1, wherein the composite section forms a part of a touch screen panel.

* * * * *